United States Patent [19]

Gold

[11] Patent Number: 5,668,530

[45] Date of Patent: Sep. 16, 1997

[54] VAN REAR THREE-LIGHT DISPLAY

[76] Inventor: Peter Gold, 465 N. Wood Rd., Rockville Centre, N.Y. 11570

[21] Appl. No.: 593,140

[22] Filed: Feb. 1, 1996

[51] Int. Cl.⁶ .................................................. B60Q 1/52
[52] U.S. Cl. ........................... 340/471; 340/468; 362/80; 362/276; 362/802
[58] Field of Search .................... 340/468, 471, 340/472; 362/80, 61, 155, 276, 802

[56] References Cited

U.S. PATENT DOCUMENTS

| | | | |
|---|---|---|---|
| 2,844,810 | 7/1958 | Steele et al. | 340/471 |
| 3,263,211 | 7/1966 | Heidman et al. | 340/471 |
| 4,833,448 | 5/1989 | Chang | 340/468 |
| 4,843,370 | 6/1989 | Milde, Jr. | 340/471 |
| 5,193,895 | 3/1993 | Naruke et al. | 362/80 |
| 5,523,926 | 6/1996 | Gold | 340/472 |

*Primary Examiner*—Jeffery Hofsass
*Assistant Examiner*—Daniel J. Wu
*Attorney, Agent, or Firm*—Myron Amer P.C.

[57] ABSTRACT

A rearwardly facing three-light display of a parked van to inform an approaching motorist if one, both or none of the rear doors are open, using to advantage lights that are illuminated in the display and also lights, although illuminated, that are not seen by the approaching motorist because of being masked from view by an open door, resulting in three possible light displays which, as a result of driver education, will inform the approaching motorist of the open and closed condition of the rear doors of the parked or stationary van.

1 Claim, 1 Drawing Sheet

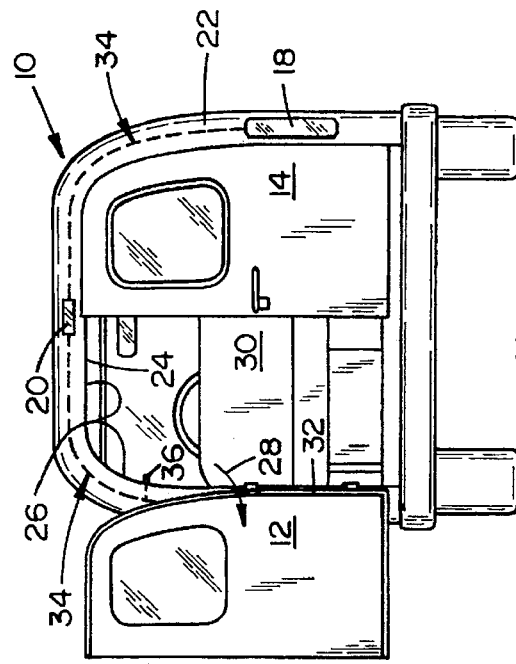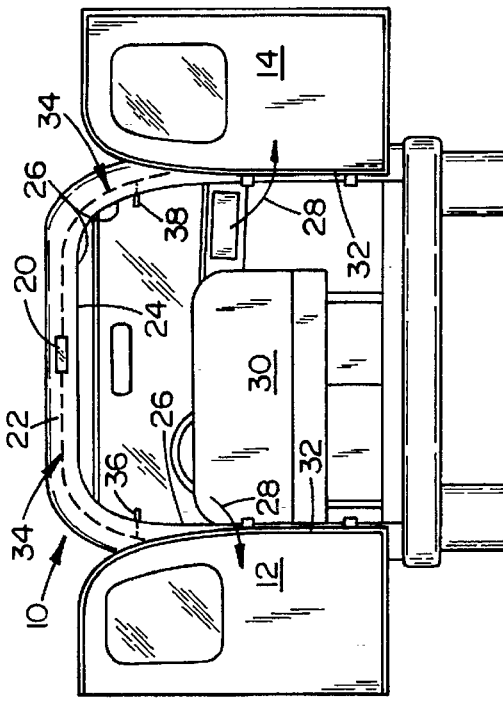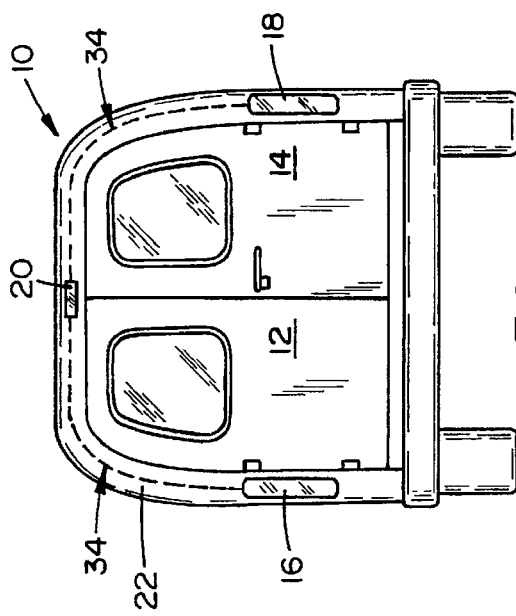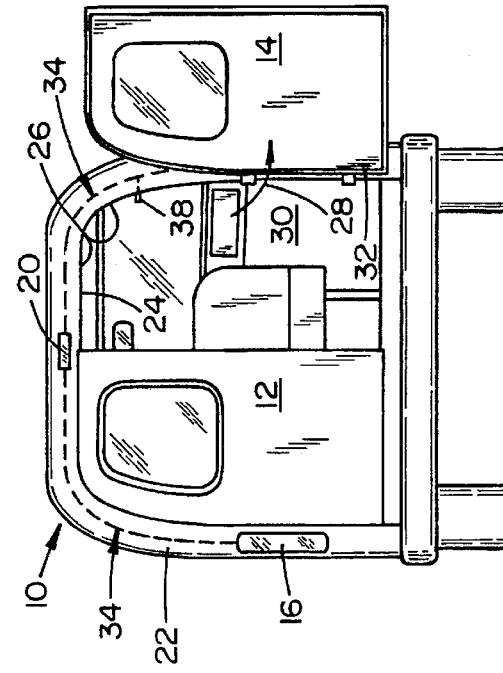

VAN REAR THREE-LIGHT DISPLAY

The present invention relates generally to improvements in industrial van rear lights that are displayed to a motorist approaching the parked van which, through driver education, will provide specific information to the motorist concerning the open or closed condition of the rear doors during the loading or unloading of the van.

EXAMPLES OF THE PRIOR ART

An open door of a parked vehicle extending into the traffic lanes is a safety hazard for which numerous prior patents propose solutions, such patents being exemplified by U.S. Pat. No. 2,844,810 issued to G. H. Steele, Jr. for "Safety Exit Alert for Automobiles" on Jul. 22, 1988 and U.S. Pat. No. 3,263,211 issued to William A. Heidman, Jr. for "Automatic Safety Flasher Signal for Automobiles" on Jul. 26, 1966, both of which illuminate a rearwardly facing light when a vehicle door is opened, and U.S. Pat. No. 4,843,370 issued to Karl F. Milde, Jr. for "Intelligent Automatic Hazard Light for a Motor Vehicle" on Jun. 27, 1989 which provides as a control over the operating mode of a rearwardly facing light means for sensing the driving environment of the motor vehicle and for changing the display of the rearwardly facing light in accordance with the sensed environment.

The aforesaid and all other known prior patents directed to this problem provide a light display which, while probably understood by an approaching motorist connotes a hazardous road condition, fails to connote any specific details of the hazard and/or fails to connote the specific details in an unambiguous and readily understood manner. Taking the light display of the Steele '810 patent as an example of the prior art shortcoming, when the driver's side door is open a light on the free end of the door is illuminated, but this illuminated light could be mistaken for a left tail light of a vehicle wider than the vehicle actually involved, or the driver while exiting from the vehicle might mask the light from view, or the illuminated light on the door free end could be mistaken for a motorcycle tail light, and so on.

Broadly, it is an object of the present invention to provide a coded or specific information-imparting van rear light display overcoming the foregoing and other shortcomings of the prior art.

More particularly, it is an object to operate a rearwardly facing three-light display of a parked van to inform an approaching motorist if one, both or none of the rear doors are open, using to advantage lights that are illuminated in the display and also lights, although illuminated, that are not seen by the approaching motorist because of being masked from view by an open door, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a known three-light display in an assumed illuminated mode as presented to a motorist approaching a parked industrial van having left and right doors in their closed condition;

FIG. 2 is a first modification of said three-light display with said left door in an open condition;

FIG. 3 is a second modification of said three-light display with said right door in an open condition; and FIG. 4 is a third modification of said three-light display with both said left and right doors in their open condition.

The present invention is directed to improvements to be applied to a van 10, typically for industrial but now also popular for recreational use, of a type having left and right doors 12 and 14, each pivotally traversable between closed and open conditions, as respectively noted in FIGS. 1 and 4, and a known primarily brake-operated and also, when stationary, dashboard light-illuminating button controlled, three-light display of a triangular configuration, as best noted in FIG. 1, in surrounding relation about said left and right doors 12 and 14.

As known, the three-light display, as presented to an approaching motorist consists of two tail lights 16 and 18, each laterally adjacent a cooperating one said left and right doors 12 and 14 and an elevated single tail light 20 centrally located above the doors 12, 14.

In a rear van wall 22 there is an edge 24 bounding an opening 26 for the pivotal traversing, denoted by the arrows 28, of the left and right doors 12, 14 between their closed and opened conditions in relation to the opening 26, the opening of the doors 12, 14 providing access from the rear into the interior 30 of the van 10. Each door 12, 14 has a peripheral edge 32, which when the doors 12, 14 are closed, assume a position adjacent to the opening-bounding edge 24 thereby forming a rear closure for the van interior 30.

In accordance with the present invention, a readily understood and implemented electrical circuit, generally designated 34 in FIGS. 2, 3, and 4, is provided for the three-light display 16, 18 and 20 and, more particularly for the FIGS. 2, 3 and 4 modifications thereof. The added electrical circuit 34 which functionally is an adjunct to the dashboard light-illuminating button control, in that it will be understood to be electrically effective to illuminate the three-light display 16, 18 and 20 when the van 10 is stationary or parked, as when access is being made to the van interior 30 to load or unload cargo, includes two electrical switches 36 and 38, each located in an interposed position 40 between the opening bounding-edge 24 and the peripheral edges 32 of the doors 12, 14. Each switch 36, 38 will be understood to be of a spring-operated type in which the switch is "off" in a door-depressing condition, as occurs in the door condition of FIG. 1, and a condition when the switch is "on", or electrically effective to illuminate the three-light display, when in a door-releasing condition resulting in the closing of the electrical circuit 34 under spring urgency, as occurs in the door conditions of FIGS. 2, 3 or 4.

From the preceding description it should be readily understood that when parked, a non-braking event that would not ordinarily illuminate the three-light display 16, 18, 20, or when the light-illuminating dashboard button control has not been used, that the three possible door open conditions of FIGS. 2, 3 and 4 nevertheless provide three distinct modified light displays via the added electrical circuit 34 operated by an appropriate one or both switches 36, 38. More particularly, through driver education, to an approaching motorist to the within van 10 parked on the right, the FIG. 2 display will connote a potential safety hazard of the left door 12 obscuring the tail light 16 and extending laterally into the left passing lane, and with the within van 10 parked on the left, the FIG. 3 display will connote a potential safety hazard of the right door 14 obscuring the right tail light 18 and extending laterally into the right passing lane.

When used for industrial purposes, it is not uncommon for utility or telephone repair employees to park a van centrally of a thoroughfare forward of a so-called "manhole", and in reduced visibility the FIG. 4 light display is a safety light display signalling an open door hazard requiring caution in passing the van from either side.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. Improvements for a van of a type having left and right rear doors pivotally traversable between closed and open conditions and a known brake-operated three-light display of a triangular configuration in surrounding relation about said left and right doors consisting of two tail lights each laterally adjacent a cooperating one said left and right rear door and an elevated single tail light centrally located above said left and right doors, said improvements for said three-light display comprising a rear van wall means having edges bounding an opening for said pivotally traversing of said left and right doors between said closed and open conditions thereof in relation to said opening, said left and right doors each having peripheral edges cooperating with said wall means opening-bounding edges to form a rear closure for said van, an electrical circuit for said three-light display, and two electrical switches each having a door-depressing condition and a door-releasing condition operatively located in an interposed position between said wall means opening-bounding edges and said left and right door peripheral edges electrically connected to said electrical circuit to activate said three-light display only in said switch door-releasing condition, whereby during non-braking operation of said three-light display an opening of one said left and right rear door unavoidably obscuring a tail light adjacent thereto to an approaching motorist is effective to operate said three-light display in a modified display consisting of said single centrally located tail light and a visible tail light of a closed door and a non-visible tail light of an open door to thereby inform said approaching motorist of said open condition of said one door.

\* \* \* \* \*